United States Patent
Tsai et al.

(10) Patent No.: US 10,439,489 B1
(45) Date of Patent: Oct. 8, 2019

(54) HYBRID-MODE BOOST POWER FACTOR CORRECTOR AND METHOD OF OPERATING THE SAME

(71) Applicant: Chicony Power Technology Co., Ltd., New Taipei (TW)

(72) Inventors: Hsien-Yi Tsai, New Taipei (TW); Yu-Chen Liu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/158,846

(22) Filed: Oct. 12, 2018

(30) Foreign Application Priority Data

Jul. 4, 2018 (TW) .............................. 107123137 A

(51) Int. Cl.
*H02M 1/00* (2006.01)
*H02M 1/42* (2007.01)
*H02M 3/335* (2006.01)
*H02M 7/04* (2006.01)
(Continued)

(52) U.S. Cl.
CPC ........ *H02M 1/4225* (2013.01); *H02M 1/4258* (2013.01); *H02M 3/158* (2013.01); *H02M 3/33507* (2013.01); *H02M 3/33538* (2013.01); *H02M 3/33546* (2013.01); *H02M 7/043* (2013.01); *H02M 7/12* (2013.01); *H02M 2001/0009* (2013.01); *H02M 2001/0012* (2013.01)

(58) Field of Classification Search
CPC . H02M 2001/0009; H02M 2001/0012; H02M 1/4225; H02M 1/12; H02M 3/158; H02M 7/043; H02M 7/12
See application file for complete search history.

(56) References Cited

U.S. PATENT DOCUMENTS

| 8,125,805 B1 | 2/2012 | Melanson |
| 9,331,588 B2 | 5/2016 | Chen |
| 9,374,083 B2 | 6/2016 | Sawada |

(Continued)

FOREIGN PATENT DOCUMENTS

| CN | 102255490 A | 11/2011 |
| CN | 102422519 A | 4/2012 |

(Continued)

*Primary Examiner* — Yusef A Ahmed
*Assistant Examiner* — David A. Singh
(74) *Attorney, Agent, or Firm* — Muncy, Geissler, Olds & Lowe, P.C.

(57) ABSTRACT

A hybrid-mode boost power factor corrector includes an inductor, a switch unit, a diode unit, a current-detecting unit, and a control unit. The inductor is coupled to a DC input power source. The switch unit is coupled to the inductor and a ground. The diode unit is coupled to the inductor and the switch unit. The current-detecting unit receives an inductor current flowing through the inductor and provides a current detection signal corresponding to the inductor current. The control unit is coupled to the current-detecting unit to receive the current detection signal. When the hybrid-mode boost power factor corrector is operated in a light-load condition, the control unit samples a peak value of the current detection signal; when the hybrid-mode boost power factor corrector is operated in a heavy-load condition, the control unit samples an average value of the current detection signal.

18 Claims, 9 Drawing Sheets

(51) Int. Cl.
*H02M 7/12* (2006.01)
*H02M 3/158* (2006.01)

(56) References Cited

U.S. PATENT DOCUMENTS

| | | | | |
|---|---|---|---|---|
| 9,510,401 B1* | 11/2016 | Kost | ................... | H02M 1/4225 |
| 9,632,120 B2 | 4/2017 | Lim et al. | | |
| 2004/0150380 A1* | 8/2004 | Santin | ..................... | G05F 1/70 |
| | | | | 323/283 |
| 2004/0263140 A1* | 12/2004 | Adragna | .................. | G05F 1/70 |
| | | | | 323/282 |
| 2005/0168198 A1* | 8/2005 | Maksimovic | ....... | H02M 1/4225 |
| | | | | 323/222 |
| 2005/0270813 A1* | 12/2005 | Zhang | ................ | H02M 1/4225 |
| | | | | 363/89 |
| 2008/0018261 A1* | 1/2008 | Kastner | .................. | F21V 23/00 |
| | | | | 315/192 |
| 2008/0061759 A1* | 3/2008 | Lin | ...................... | H02M 3/157 |
| | | | | 323/290 |
| 2008/0272748 A1* | 11/2008 | Melanson | .......... | H02M 1/4225 |
| | | | | 323/207 |
| 2008/0316779 A1* | 12/2008 | Jayaraman | .......... | H02M 1/4225 |
| | | | | 363/74 |
| 2009/0039852 A1* | 2/2009 | Fishelov | .............. | H02M 3/157 |
| | | | | 323/283 |
| 2012/0014148 A1* | 1/2012 | Li | ....................... | H02M 1/4216 |
| | | | | 363/78 |
| 2012/0069611 A1* | 3/2012 | Yang | .................. | H02M 1/4225 |
| | | | | 363/44 |
| 2012/0169313 A1* | 7/2012 | Lee | ..................... | H02M 1/4225 |
| | | | | 323/282 |
| 2012/0206064 A1* | 8/2012 | Archenhold | ....... | H05B 33/0812 |
| | | | | 315/297 |
| 2012/0235649 A1* | 9/2012 | Uno | .................... | H02M 1/4225 |
| | | | | 323/210 |
| 2012/0236612 A1* | 9/2012 | Uno | ........................ | H02M 1/36 |
| | | | | 363/126 |
| 2013/0223119 A1* | 8/2013 | Zhao | ................... | H02M 1/4225 |
| | | | | 363/89 |
| 2013/0294118 A1* | 11/2013 | So | ..................... | H02M 3/33507 |
| | | | | 363/21.16 |
| 2014/0097808 A1* | 4/2014 | Clark | ....................... | G05F 1/70 |
| | | | | 323/208 |
| 2014/0169049 A1* | 6/2014 | Chandrasekaran | . | H02M 1/4225 |
| | | | | 363/84 |
| 2015/0146458 A1* | 5/2015 | Lim | ..................... | H02M 3/158 |
| | | | | 363/44 |
| 2016/0241134 A1* | 8/2016 | Maruyama | ......... | H02M 1/4225 |

FOREIGN PATENT DOCUMENTS

| | | |
|---|---|---|
| CN | 105738689 A | 7/2016 |
| CN | 105763051 A | 7/2016 |
| CN | 106487215 A | 3/2017 |
| CN | 107979279 A | 5/2018 |
| TW | I382291 B | 1/2013 |
| TW | I456876 B | 10/2014 |
| TW | I509381 B | 11/2015 |
| TW | 201824721 A | 7/2018 |

\* cited by examiner ary of the Invention

HYBRID-MODE BOOST POWER FACTOR CORRECTOR AND METHOD OF OPERATING THE SAME

BACKGROUND OF THE INVENTION

Field of the Invention

The present invention relates to a boost power factor corrector and method of operating the same, especially to a hybrid-mode boost power factor corrector and method of operating the same.

Description of Prior Art

The controlling of the conventional boost power factor corrector (PFC) can be classified into continuous conduction mode (CCM) and critical conduction mode (CRM). In view of different loading, the boost PFC generally employs CCM control for high power or heavy-load operation. Namely, the boost PFC detects the average value of the inductor current thereof and control the switching of power switch accordingly. On the contrary, the boost PFC generally employs CRM control for low power or light-load operation. Namely, the boost PFC detects the peak value of the inductor current thereof and control the switching of power switch accordingly The CCM control or the CRM control alone cannot provide advantages for both of heavy-load operation and light-load operation, it is desirable to provide boost PFC for hybrid-mode operation and the research/development thereof is under extensive effort. Generally, based on the circuit topology combining above two operation modes, detection circuit and logic circuit can be used to switch the two operation modes. In other word, the boost PFC is switched to CCM control mode when the detection circuit detects the heavy-load operation of the boost PFC; while the boost PFC is switched to CRM control mode when the detection circuit detects the light-load operation of the boost PFC.

By above switching manner, the boost PFC can be switched between two control modes to meet the requirement of loading condition. However, this switching manner has additional cost for detection circuit and logic circuit. It is also demanding to precisely detect the loading condition of the boost PFC to instantly switch the boost PFC to desirable control mode.

SUMMARY OF THE INVENTION

It is an object of the present invention to provide a hybrid-mode boost power factor corrector to solve the problem of additional detection circuit and logic circuit, which causes bottleneck and challenge of accuracy and real-time control.

Accordingly, the present invention provides a hybrid-mode boost power factor corrector comprising: an inductor having a first end coupled to a DC input power source and a second end; a switch unit having a first end and a second end coupled to a ground; a diode unit having a first end coupled to the second end of the inductor and the first end of the switch unit, and a second, where a DC output power is provided between the second end of the diode unit and the ground to supply electric power to a load; a current-detecting unit receiving an inductor current flowing through the inductor and providing a current detection signal corresponding to a magnitude of the inductor current; and a control unit coupled to the current-detecting unit and receiving the current-detecting unit; wherein when the hybrid-mode boost power factor corrector is operated in a light-load condition, the control unit samples a peak value of the current detection signal; when the hybrid-mode boost power factor corrector is operated in a heavy-load condition, the control unit samples an average value of the current detection signal.

According to one embodiment, the current-detecting unit is arranged on an energy-storage path provided by the inductor, and the switch unit has a switching period and a duty ratio; when the load is heavy, the control unit is configured to sample an average value of the current detection signal at a sampling time point, wherein the sampling time point is:

$$t_{sp} = t_{on} + \frac{D}{2} \times T_{SW};$$

wherein $t_{sp}$ is the sampling time point, $t_{on}$ is on-starting time for the switch unit, D is the duty ratio, and Tsw is the switching period.

According to one embodiment, the current-detecting unit is arranged on an energy-releasing path provided by the inductor, and the switch unit has a switching period and a duty ratio; when the load is heavy, the control unit is configured to sample an average value of the current detection signal at a sampling time point, wherein the sampling time point is:

$$t_{sp} = t_{off} + \frac{(1-D)}{2} \times T_{SW};$$

wherein $t_{sp}$ is the sampling time point, $t_{off}$ is off-starting time for the switch unit, D is the duty ratio, and Tsw is the switching period.

According to one embodiment, the control unit is configured to sample a plurality of current detection signals at the sampling time point and at symmetric time points before and after the sampling time point during a same period, the control unit is configured to calculate an arithmetic mean for sampled current detection signals to obtain a single-period average value.

According to one embodiment, the control unit is configured to calculate an arithmetic mean for the single-period average values at successive periods to obtain a successive-period average value.

According to one embodiment, when the load is light, the hybrid-mode boost power factor corrector operates in critical conduction mode (CRM); when the load is heavy, the hybrid-mode boost power factor corrector operates in continuous conduction mode (CCM).

According to one embodiment, the current-detecting unit is a current detecting resistor or a Hall sensor.

According to one embodiment, the switch unit has a parasitic capacitance, the hybrid-mode boost power factor corrector has a resonant voltage at a common node Pc between the second end of the inductor and the first end of the switch unit when the inductor has resonance with the parasitic capacitance; wherein the control unit is configured to switch the switch unit when the control unit senses that the resonant voltage is at valley point.

According to one embodiment, the control unit is a digital controller.

By the hybrid-mode boost power factor corrector of the present invention, operations in different modes can be achieved with accuracy and in real time, and having high flexibility, high reliability and adaptability. The cost of device can be saved and the control mechanism can be simplified.

It is another object of the present invention to provide a method of operating a hybrid-mode boost power factor corrector to solve the problem of additional detection circuit and logic circuit, which causes bottleneck and challenge of accuracy and real-time control.

Accordingly, the present invention provides a method of operating a hybrid-mode boost power factor corrector, the hybrid-mode boost power factor corrector comprising an inductor, a current-detecting unit and a control unit, the method comprising: using the current-detecting unit to receive an inductor current flowing through the inductor and to provide a current detection signal corresponding to a magnitude of the inductor current; the control unit receiving the current detection signal; when a load is light, the control unit samples a peak value of the current detection signal; when the load is heavy, the control unit samples an average value of the current detection signal.

According to one embodiment, the current-detecting unit is arranged on an energy-storage path provided by the inductor, and the switch unit has a switching period and a duty ratio; when the load is heavy, the control unit is configured to sample an average value of the current detection signal at a sampling time point, wherein the sampling time point is:

$$t_{sp} = t_{on} + \frac{D}{2} \times T_{SW};$$

wherein $t_{sp}$ is the sampling time point, $t_{on}$ is on-starting time for the switch unit, D is the duty ratio, and Tsw is the switching period.

According to one embodiment, the current-detecting unit is arranged on an energy-releasing path provided by the inductor, and the switch unit has a switching period and a duty ratio; when the load is heavy, the control unit is configured to sample an average value of the current detection signal at a sampling time point, wherein the sampling time point is:

$$t_{sp} = t_{off} + \frac{(1-D)}{2} \times T_{SW};$$

wherein $t_{sp}$ is the sampling time point, $t_{off}$ is off-starting time for the switch unit, D is the duty ratio, and Tsw is the switching period.

According to one embodiment, the control unit is configured to sample a plurality of current detection signals at the sampling time point and at symmetric time points before and after the sampling time point during a same period, the control unit is configured to calculate an arithmetic mean for sampled current detection signals to obtain a single-period average value.

According to one embodiment, the control unit is configured to calculate an arithmetic mean for the single-period average values at successive periods to obtain a successive-period average value.

According to one embodiment, when the load is light, the hybrid-mode boost power factor corrector operates in critical conduction mode (CRM); when the load is heavy, the hybrid-mode boost power factor corrector operates in continuous conduction mode (CCM).

According to one embodiment, the control unit is a digital controller.

By the method of operating a hybrid-mode boost power factor corrector of the present invention, operations in different modes can be achieved with accuracy and in real time, and having high flexibility, high reliability and adaptability. The cost of device can be saved and the control mechanism can be simplified.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
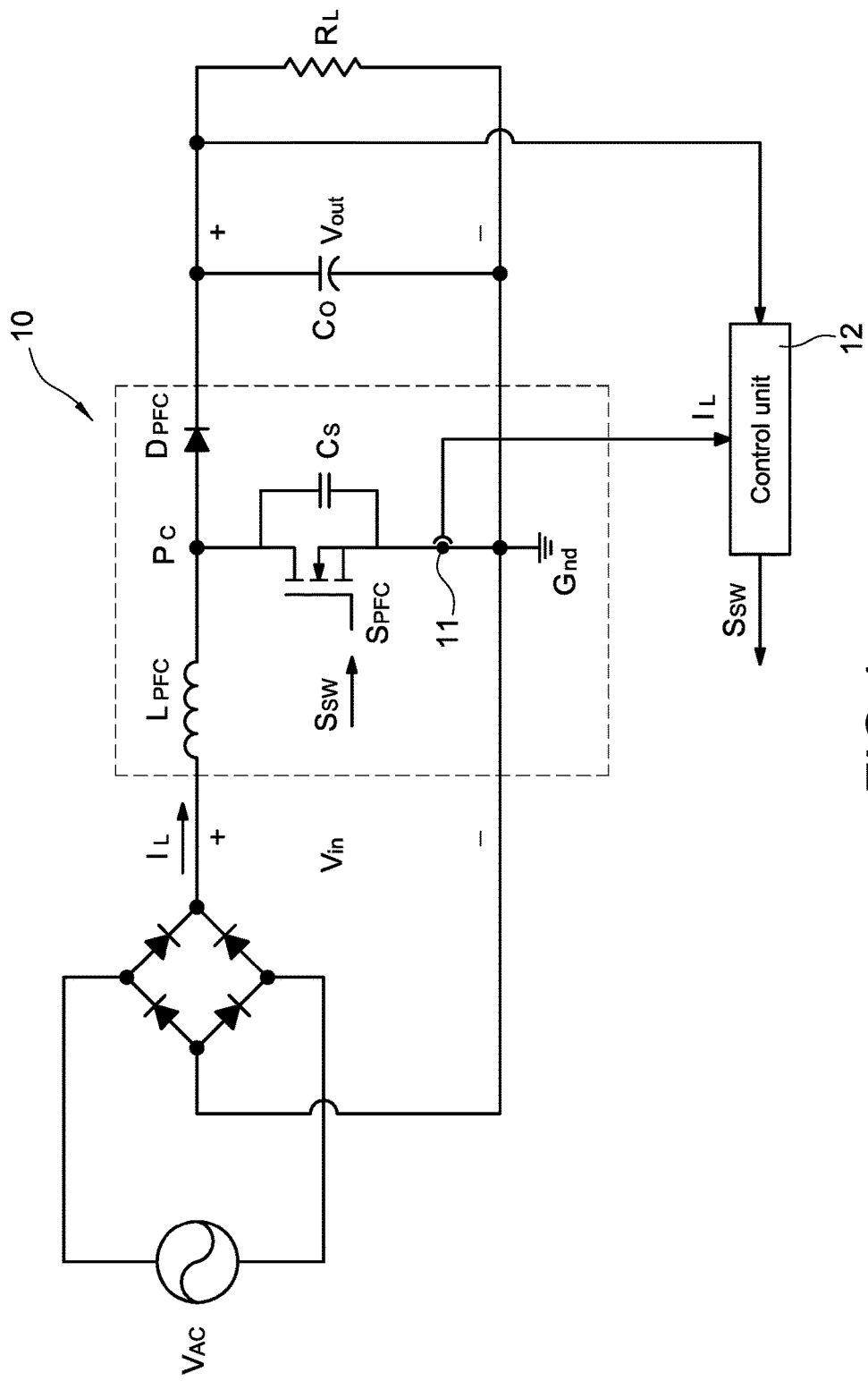
FIG. 1 is a circuit diagram for the hybrid-mode boost power factor corrector (PFC) according to the present invention.

FIG. 1 is a circuit diagram for the hybrid-mode boost power factor corrector (PFC) according to the present invention. The boost PFC 10 comprises an inductor $L_{PFC}$, a switch unit $S_{PFC}$, a diode unit $D_{PFC}$, a current-detecting unit 11, and a control unit 12.

The inductor $L_{PFC}$ has a first end and a second end. The first end of the inductor $L_{PFC}$ is coupled to an input power source Vin. In this embodiment, the input power source Vin is a DC power source obtained by rectifying the input of an alternating input power source $V_{AC}$ with rectifying unit such as a full-wave rectifier.

The switch unit $S_{PFC}$ has a first end and a second end, while a parasitic capacitor Cs is present between the first end and the second end. The first end of the switch unit $S_{PFC}$ is coupled to the second end of the inductor $L_{PFC}$. The second end of the switch unit $S_{PFC}$ is coupled to a ground Gnd.

The diode unit $D_{PFC}$ has a first end and a second end. In this embodiment, the first end is anode while the second end is cathode. The first end of the diode unit $D_{PFC}$ is coupled to the second end of the inductor $L_{PFC}$ and the first end of the switch unit $S_{PFC}$. A DC output power Vout is provided between the second end of the diode unit $D_{PFC}$ and the ground Gnd and supplies electric power to the load $R_L$. In this embodiment, an output capacitor Co is coupled between the second end of the diode unit $D_{PFC}$ and the ground Gnd and the DC output power Vout is across the output capacitor Co. Therefore, the DC output power Vout is filtered by the output capacitor Co to ensure the quality of operation voltage for the load $R_L$.

The current-detecting unit 11 receives the inductor current $I_L$ flowing through the inductor $L_{PFC}$ and detects the magnitude of the inductor current $I_L$. More particularly, the current-detecting unit 11 generates a current sensing signal corresponding to the magnitude of the inductor current $I_L$. In one embodiment, the current-detecting unit 11 may be a current detecting resistor or a Hall sensor. But the current-detecting unit 11 is not limited thereto and can be any device, circuit or apparatus capable of measuring the magnitude of the inductor current $I_L$. Moreover, the current-detecting unit 11 shown in FIG. 1 is coupled between the second end of the switch unit $S_{PFC}$ and the ground Gnd; but this is not the limitation for the arrangement of the current-detecting unit 11. The detecting operation of the current-detecting unit 11 will be described with reference to drawings hereinafter. The control unit 12 is coupled to the current-detecting unit 11 and receives the current sensing signal provided by the current-detecting unit 11 and corresponding to the magnitude of the inductor current $I_L$. In one embodiment, the control unit 12 may be digital controller with processing, operation and controlling functions for digital signals. The control unit 12 may be, for example but not limited to, microcontroller (MCU), digital signal processor (DSP), field-programmable gate array (FPGA) or application-specific integrated circuit (ASIC).

Moreover, the control unit 12 performs digitization, operation and calculation to the analog current sensing signal provided by the current-detecting unit 11 and outputs the switching-control signal Ssw to control the turning-on and turning-off of the switch unit $S_{PFC}$. The detailed description will be made later. Besides, the current sensing signal is corresponding to the magnitude of the inductor current $I_L$, and therefore, the detection of the inductor current $I_L$ for the control unit 12 is made through detecting the average value or the peak value of the digitalized current sensing signal. In other word, the detection of peak value (or average value) of the current sensing signal means the detection of peak value (or average value) of the inductor current $I_L$, the above concept will not be repeated in following description for brevity.

Figure 2A:
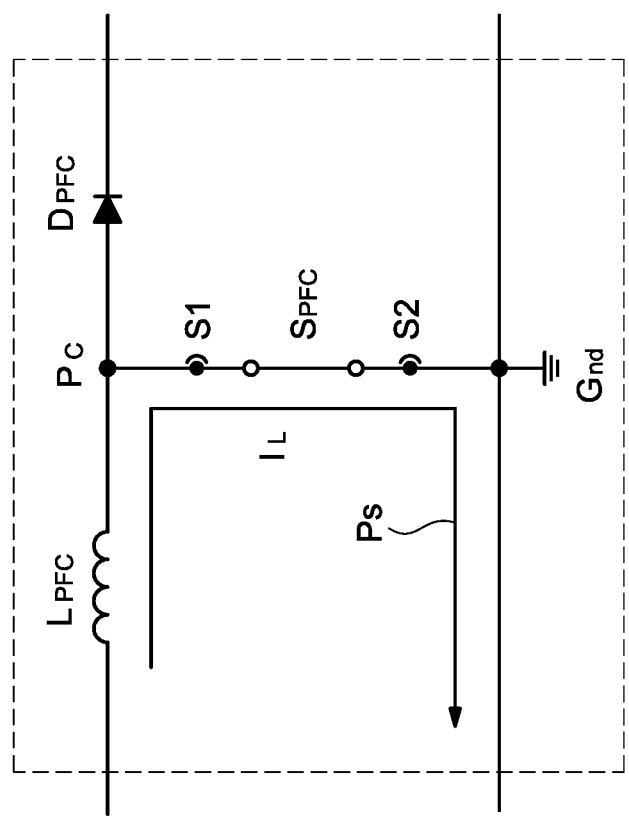
FIG. 2A is a schematic view showing the current-detecting unit of the present invention arranged in an energy-storage path.

FIG. 2A is a schematic view showing the current-detecting unit 11 of the present invention arranged in an energy-storage path. With reference also to FIG. 1, the "energy-storage path" means a path of current (energy) flows when the control unit 12 provides the switching-control signal Ssw to turn on the switch unit $S_{PFC}$, and the inductor current $I_L$ flows along the energy-storage path Ps to store electric energy in the inductor $L_{PFC}$.

Figure 2B:
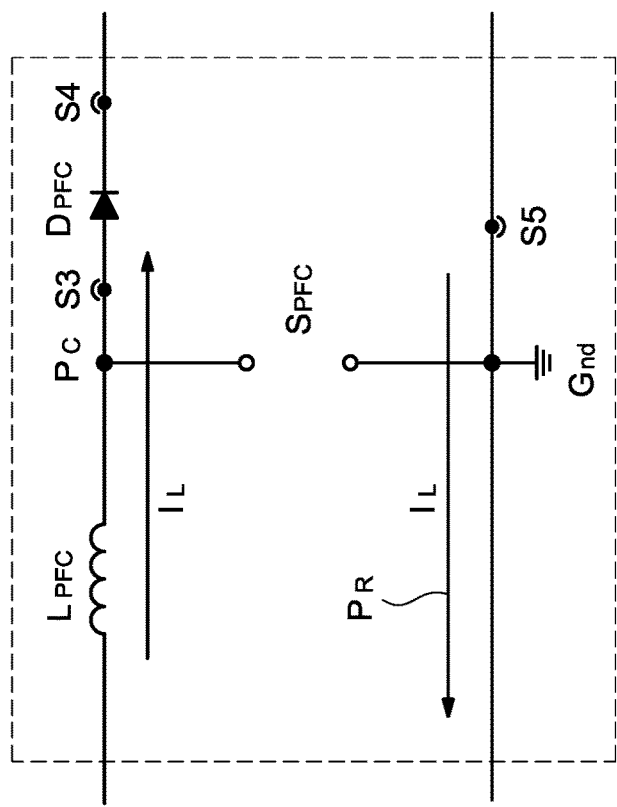
FIG. 2B is a schematic view showing the current-detecting unit of the present invention arranged in an energy-releasing path.

FIG. 2B is a schematic view showing the current-detecting unit 11 of the present invention arranged in an energy-releasing path. With reference also to FIG. 1, the "energy-releasing path" means a path of current (energy) flows when the control unit 12 provides the switching-control signal Ssw to turn off the switch unit $S_{PFC}$, and the inductor current $I_L$ flows along the energy-releasing path $P_R$ to discharge the electric energy stored in the inductor $L_{PFC}$.

In the present invention, the current-detecting unit 11 of the present invention may be arranged at various locations along the energy-storage path Ps as shown in FIG. 2A, or along the energy-releasing path $P_R$ shown in FIG. 2B to flexibly and reliably detect the inductor current $I_L$. The following description will made for the different operations of the inductor $L_{PFC}$ in energy-storage status or energy-releasing status.

With reference to FIG. 2A, the operation associated with the inductor $L_{PFC}$ in energy-storage status will be described. The current-detecting unit 11 is arranged at the energy-storage path Ps provided by the inductor $L_{PFC}$, where the energy-storage path Ps is coupled to the input end of the boost PFC 10. In other word, any one of the detecting points S1~S2 shown in FIG. 2A can be the detecting location for the current-detecting unit 11, thus flexibly and reliably detect the magnitude of the inductor current $I_L$. More particularly, the inductor current $I_L$ flowing through the energy-storage path Ps when the control unit 12 provides the switching-control signal Ssw to turn on the switch unit $S_{PFC}$. Therefore, the current-detecting unit 11 can precisely detect the magnitude of the inductor current $I_L$ as long as the current-detecting unit 11 is arranged at any one of the detecting points S1~S2 shown in FIG. 2A.

With reference to FIG. 2B, the operation associated with the inductor $L_{PFC}$ in energy-releasing status will be described. The current-detecting unit 11 is arranged at the energy-releasing path $P_R$ provided by the inductor $L_{PFC}$, where the energy-releasing path $P_R$ is coupled to the output end of the boost PFC 10. In other word, any one of the detecting points S3~S5 shown in FIG. 2B can be the detecting location for the current-detecting unit 11, thus flexibly and reliably detect the magnitude of the inductor current $I_L$. More particularly, the inductor current $I_L$ flowing through the energy-releasing path $P_R$ when the control unit 12 provides the switching-control signal Ssw to turn off the switch unit $S_{PFC}$. Therefore, the current-detecting unit 11 can precisely detect the magnitude of the inductor current $I_L$ as long as the current-detecting unit 11 is arranged at any one of the detecting points S3~S5 shown in FIG. 2B.

Figure 3A:
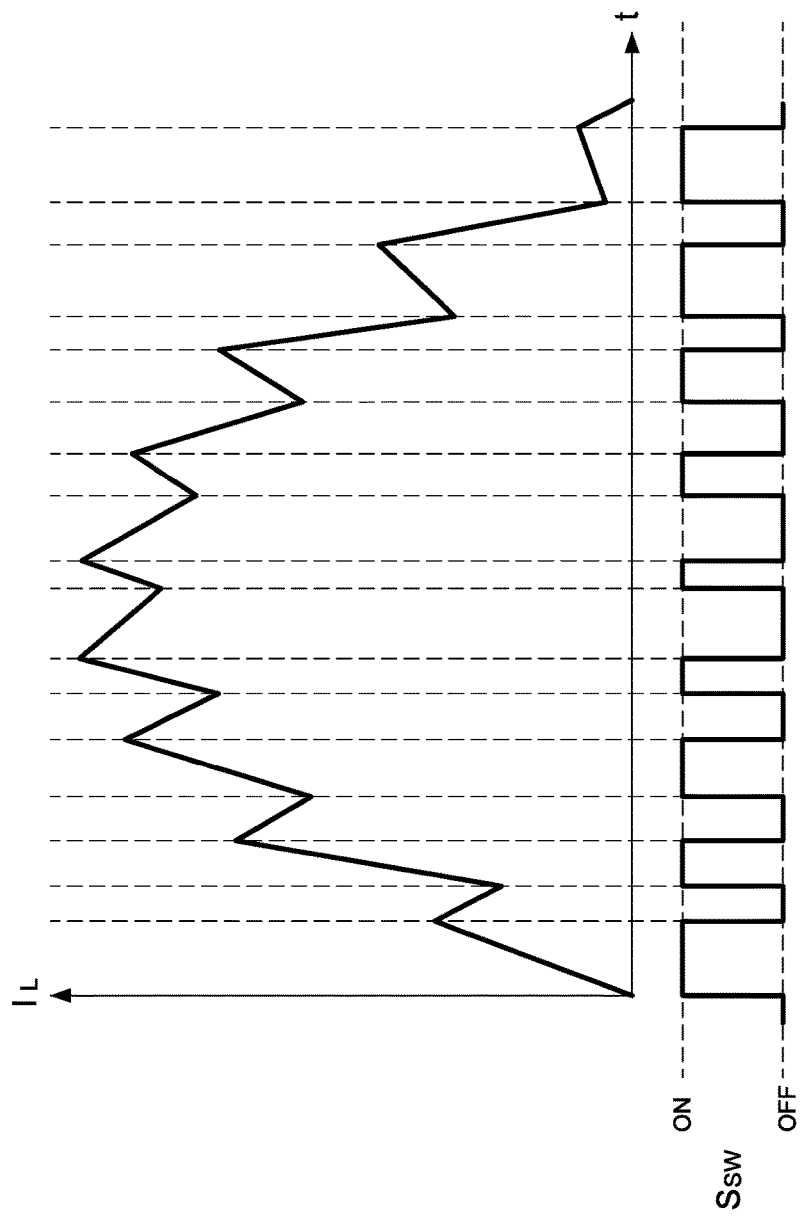
FIG. 3A shows the waveform of the inductor current in the first embodiment of the present invention.

FIG. 3A shows the waveform of the inductor current in the first embodiment of the present invention. The upper portion of FIG. 3A shows the current value of the inductor current $I_L$, while the lower portion of FIG. 3A shows the voltage level of the switching-control signal Ssw. As can be seen clearly from FIG. 3A, when the switching-control signal Ssw output by the control unit 12 is at high level, the switch unit $S_{PFC}$ is turned on by the high-level switching-control signal Ssw and the inductor $L_{PFC}$ is in energy-storage operation. At this time, the inductor current $I_L$ gradually increases and the inductor current $I_L$ flows through the energy-storage path Ps shown in FIG. 2A. On the contrary, when the switching-control signal Ssw output by the control unit 12 is low level, the switch unit $S_{PFC}$ is turned off by the low-level switching-control signal Ssw and the inductor $L_{PFC}$ is in energy-releasing operation. At this time, the inductor current $I_L$ gradually decreases and the inductor current $I_L$ flows through the energy-releasing path $P_R$ shown in FIG. 2B.

Therefore, the boost PFC 10 of the present invention may use the current-detecting unit 11 arranged at any one of the detecting points S1~S2 shown in FIG. 2A to detect the magnitude of the inductor current $I_L$ flowing through the energy-storage path Ps when the switch unit $S_{PFC}$ is turned on. Moreover, the boost PFC 10 of the present invention may use the current-detecting unit 11 arranged at any one of the detecting points S3~S5 shown in FIG. 2B to detect the magnitude of the inductor current $I_L$ flowing through the energy-releasing path $P_R$ when the switch unit $S_{PFC}$ is turned off. In other word, the detecting unit 11 arranged at any one of the detecting points S1~S2 shown in FIG. 2A can be used to detect the magnitude of the inductor current $I_L$ with positive slope of current change. On the contrary, the detecting unit 11 arranged at any one of the detecting points S3~S5 shown in FIG. 2B can be used to detect the magnitude of the inductor current $I_L$ with negative slope of current change.

When the boost PFC 10 is detected to operate in light-load status (namely, the load $R_L$ is lightly-loaded), where the light-load status includes the boost PFC 10 in soft start operation, the control unit 12 operates the boost PFC 10 in CRM, namely, the control unit 12 samples the peak value of the inductor current $I_L$ detected by the detecting unit 11. For example, the control unit 12 samples the inductor current $I_L$ at time points when the switching-control signal Ssw switches from high level to low level, thus obtain the peak value of the inductor current $I_L$ at the present period and achieve the peak value detection of current for CRM.

When the boost PFC 10 is detected to operate in heavy-load status (namely, the load $R_L$ is heavily-loaded), the control unit 12 operates the boost PFC 10 in CCM. The control unit 12 samples the average value of the inductor current $I_L$ detected by the detecting unit 11, the detailed operation is described below.

The following examples are made with reference to the current sampling (for inductor current $I_L$) at any one of the detecting points S1~S2 shown in FIG. 2A, and/or with reference to the current sampling (for inductor current $I_L$) at any one of the detecting points S3~S5 shown in FIG. 2B. FIG. 4A shows the schematic view of sampling the average value of the inductor current $I_L$ during energy-storage operation, namely, the partially enlarged view of FIG. 3B. FIG. 4B shows the schematic view of sampling the average value of the inductor current $I_L$ during energy-releasing operation, namely, the partially enlarged view of FIG. 3C. The upper portions of FIGS. 4A and 4B show the value of the inductor current $I_L$ while the lower portions of FIGS. 4A and 4B show the level of the switching-control signal Ssw. In this embodiment, the switching-control signal Ssw for controlling on/off of the switch unit $S_{PFC}$ has switching period Tsw and duty ratio D. As shown in FIG. 4A, the turn-on period of the switch unit $S_{PFC}$ during one period is the product of switching period Tsw and duty ratio D, namely, D×Tsw. As shown in FIG. 4B, the turn-off period of the switch unit $S_{PFC}$ during one period is (1−D)×Tsw.

Figure 3B:
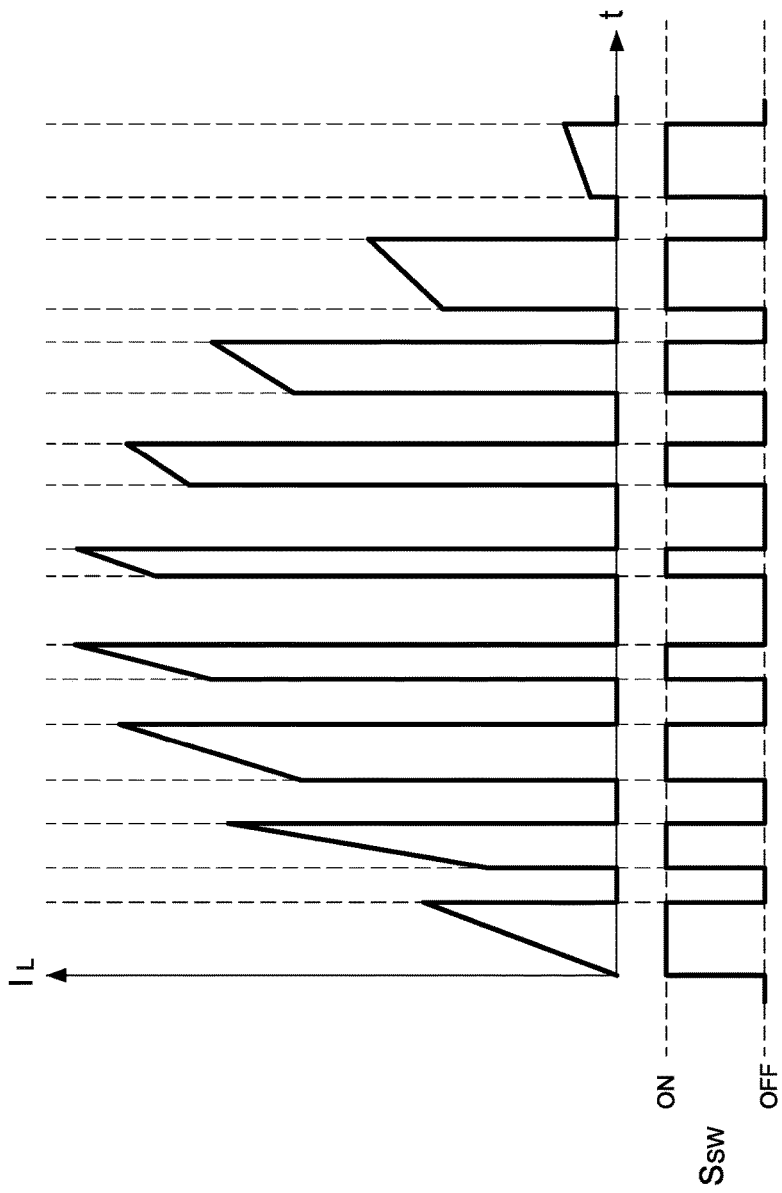
FIG. 3B shows the waveform of the inductor current in the second embodiment of the present invention.
Figure 3C:
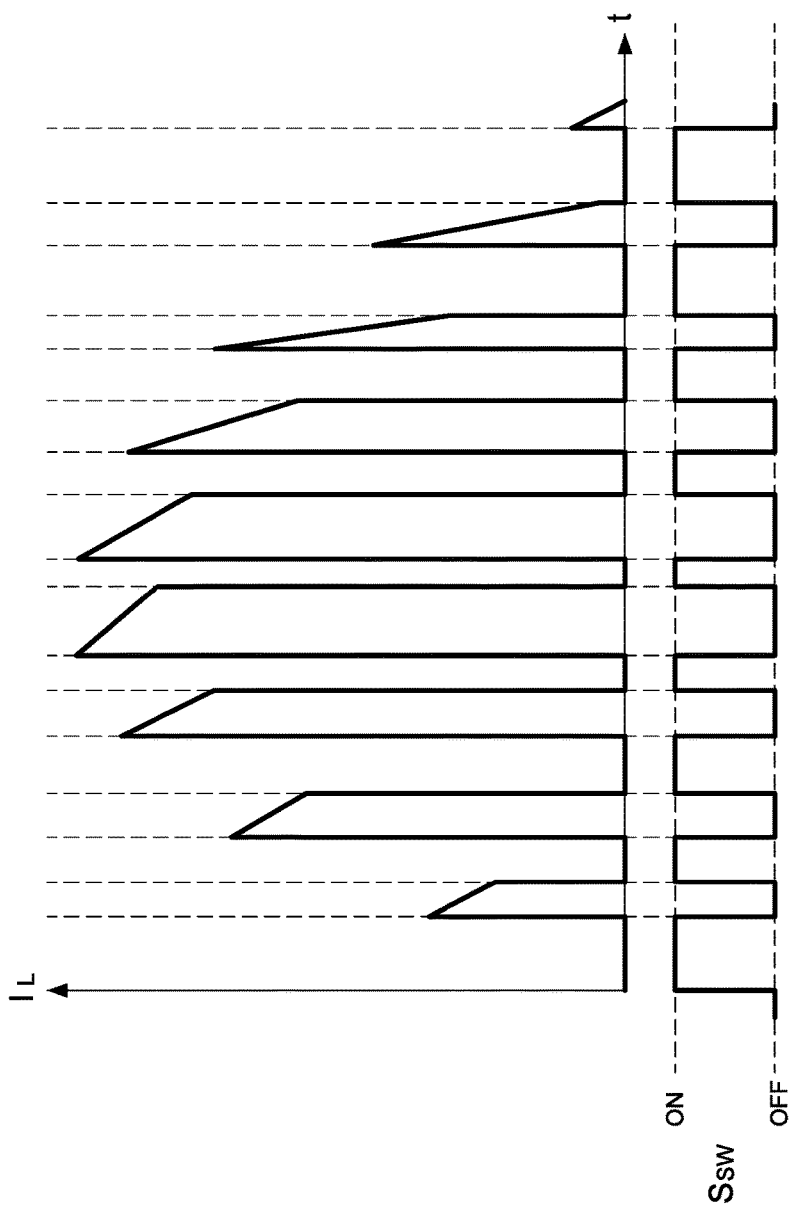
FIG. 3C shows the waveform of the inductor current in the third embodiment of the present invention.
Figure 4A:
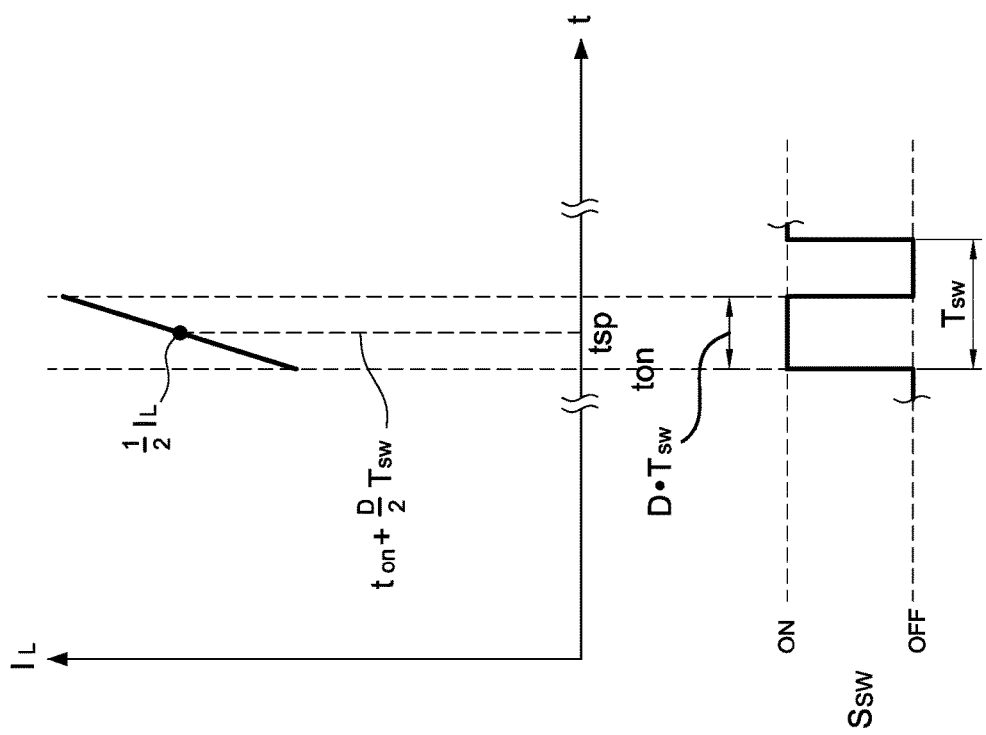
FIG. 4A shows the schematic view of sampling the average value of the inductor current during energy-storage operation.
Figure 4B:
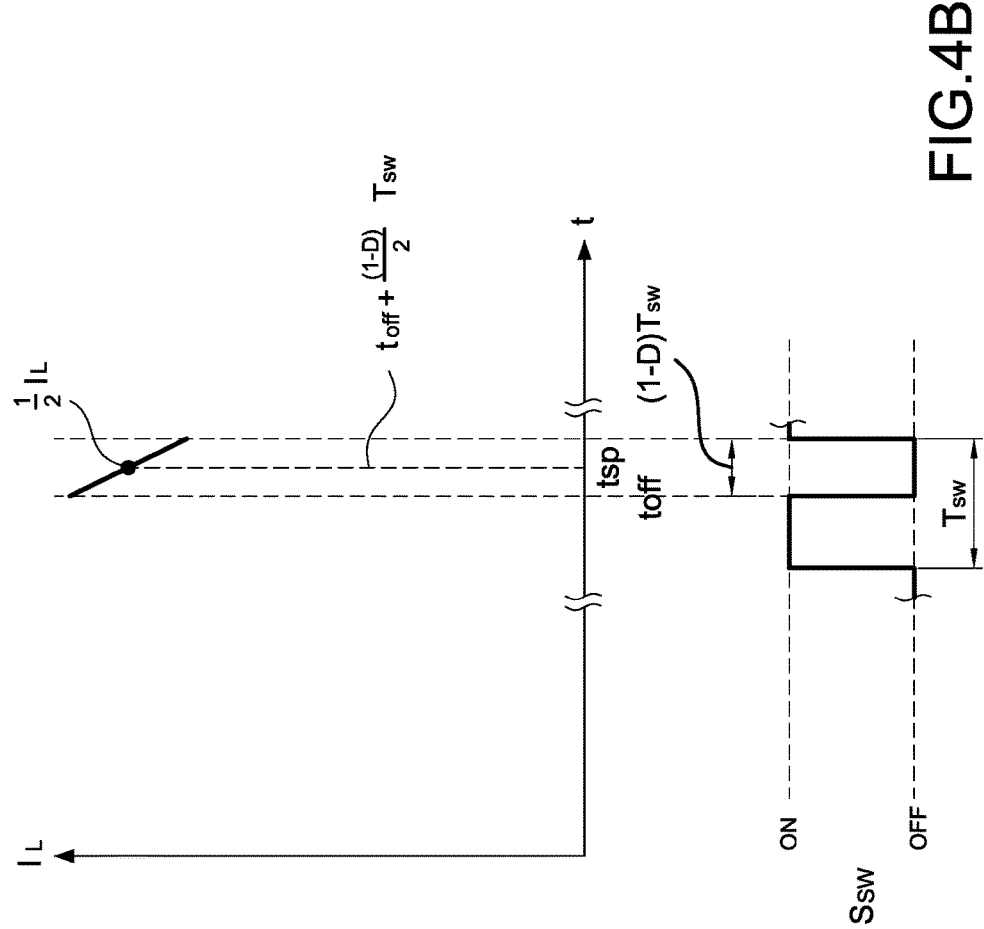
FIG. 4B shows the schematic view of sampling the average value of the inductor current during energy-releasing operation.

Moreover, as shown in FIG. 3B corresponding to FIG. 2A and where the detecting unit 11 is arranged at the energy-storage path Ps, the detecting unit 11 can effectively detect the magnitude of the inductor current $I_L$ when the switch unit $S_{PFC}$ is turned on and will not perform current detection for the inductor current $I_L$ when the switch unit $S_{PFC}$ is turned off. On the contrary, as shown in FIG. 3C corresponding to FIG. 2B and where the detecting unit 11 is arranged at the energy-releasing path $P_R$, the detecting unit 11 can effectively detect the magnitude of the inductor current $I_L$ when the switch unit $S_{PFC}$ is turned off and will not perform current detection for the inductor current $I_L$ when the switch unit $S_{PFC}$ is turned on.

The more detailed description will be made with reference to FIGS. 4A and 4B. When the boost PFC 10 is detected to operate in heavy-load status (namely, the load $R_L$ is heavily-loaded), the control unit 12 operates the boost PFC 10 in CCM. The following description will explain how the control unit 12 samples the average value of the inductor current $I_L$ detected by the detecting unit 11.

As shown in FIG. 4A, when the switching-control signal Ssw is at high level, the switching-control signal Ssw turns on the switch unit $S_{PFC}$ at the on-starting time $t_{on}$ such that the inductor current $I_L$ begins one period of energy-storage operation and the inductor current $I_L$ gradually increases. Because the switching period Tsw and duty ratio D are known values, the control unit 12 may sample the magnitude of the inductor current $I_L$ at the midpoint in the turn-on period (namely, half of the turn-on period time elapses). The current value sampled at this midpoint can be used as the average value of the inductor current $I_L$ during this period, this scheme can be applied to the turn-on period of the switching-control signal Ssw shown in FIGS. 3A and 3B. The sampling time at midpoint (the sampling time) of the turn-on period is:

$$t_{sp} = t_{on} + \frac{D}{2} \times T_{SW};$$

wherein $t_{sp}$ is the sampling time point, $t_{on}$ is on-starting time for the switch unit $S_{PFC}$, D is the duty ratio, and Tsw is the switching period. The below example is exemplified with exemplary feasible data.

Provided that the switching frequency fsw of the switch unit $S_{PFC}$ is 100 KHz, the duty ratio D is 0.5, then the switching period Tsw is the reciprocal of the switching frequency fsw, namely, 10 μs. Therefore, the sampling time point $t_{sp}$ for the average value of the inductor current $I_L$ is:

$$t_{sp} = t_{on} + \frac{0.5}{2} \times 10 \ \mu s = t_{on} + 2.5 \ \mu s;$$

namely the sampling time point $t_{sp}$ for the average value of the inductor current $I_L$ is the on-starting time $t_{on}$ for the switch unit $S_{PFC}$ plus 2.5p, and the current value sampled at the sampling time point $t_{sp}$ is the average value of the inductor current $I_L$ in this period.

Similarly, provided that the switching frequency fsw of the switch unit $S_{PFC}$ is 100 KHz (the switching period Tsw is 10p), and the duty ratio D is 0.8; the sampling time point $t_{sp}$ for the average value of the inductor current $I_L$ is:

$$t_{sp} = t_{on} + \frac{0.8}{2} \times 10 \ \mu s = t_{on} + 4 \ \mu s;$$

namely the sampling time point $t_{sp}$ for the average value of the inductor current $I_L$ is the on-starting time $t_{on}$ for the switch unit $S_{PFC}$ plus 4 μs, and the current value sampled at the sampling time point $t_{sp}$ is the average value of the inductor current $I_L$ in this period.

With respect to the above-described calculation for the sampling time point $t_{sp}$ for the turn-on period and the sampling for the average value of the inductor current $I_L$, the description for the turn-off period is as following. As shown in FIG. 4B, when the switching-control signal Ssw is at low level, the switching-control signal Ssw turns off the switch unit $S_{PFC}$ at the off-starting time $t_{off}$ such that the inductor current $I_L$ begins energy-releasing operation for this period and the inductor current $I_L$ gradually decreases. Because the switching period Tsw and duty ratio D are known values, the control unit 12 may sample the magnitude of the inductor current $I_L$ at the midpoint in the turn-off period (namely, half of the turn-off period time elapses). The current value sampled at this midpoint can be used as the average value of the inductor current $I_L$ during this turn-off period. This scheme can be applied to the turn-off period of the switching-control signal Ssw shown in FIGS. 3A and 3C. The sampling time at midpoint of the turn-off period is:

$$t_{sp} = t_{off} + \frac{(1-D)}{2} \times T_{SW};$$

wherein $t_{sp}$ is the sampling time point, $t_{off}$ is off-starting time for the switch unit $S_{PFC}$, D is the duty ratio, and Tsw is the switching period. The below example is exemplified with exemplary feasible data.

Provided that the switching frequency fsw of the switch unit $S_{PFC}$ is 100 KHz, the duty ratio D is 0.5, then the switching period Tsw is the reciprocal of the switching frequency fsw, namely, 10 μs. Therefore, the sampling time point $t_{sp}$ for the average value of the inductor current $I_L$ is:

$$t_{sp} = t_{off} + \frac{(1-0.5)}{2} \times 10 \text{ μs} = t_{off} + 2.5 \text{ μs};$$

namely the sampling time point $t_{sp}$ for the average value of the inductor current $I_L$ is the off-starting time $t_{off}$ for the switch unit $S_{PFC}$ plus 2.5p, and the current value sampled at the sampling time point $t_{sp}$ is the average value of the inductor current $I_L$ in this period.

Similarly, provided that the switching frequency fsw of the switch unit $S_{PFC}$ is 100 KHz (the switching period Tsw is 10 μs), the duty ratio D is 0.8; the sampling time point $t_{sp}$ for the average value of the inductor current $I_L$ is:

$$t_{sp} = t_{off} + \frac{(1-0.8)}{2} \times 10 \text{ μs} = t_{off} + 1 \text{ μs};$$

namely the sampling time point $t_{sp}$ for the average value of the inductor current $I_L$ is the off-starting time $t_{off}$ for the switch unit $S_{PFC}$ plus 1 μs, and the current value sampled at the sampling time point $t_{sp}$ is the average value of the inductor current $I_L$ in this period.

Besides above one-time sampling for the average value of the inductor current $I_L$ at the sampling time point $t_{sp}$ of the turn-on period and the turn-off period, in view of the fast processing ability for signals and operation ability, the digital control unit 12 may have more samplings for the inductor current $I_L$ within the same turn-on period or the turn-off period, thus more accurately obtain the average value of the inductor current $I_L$. For example, the control unit 12 may further sample the inductor current $I_L$ at additional time points besides sampling the inductor current $I_L$ at the expected sampling time point $t_{sp}$, where the additional time points are symmetric to the expected sampling time point $t_{sp}$ (for example, at midpoint of the turn-on period and the turn-off period, respectively) and the additional time points may lag behind or be ahead of the expected sampling time point $t_{sp}$ (namely, after or before the expected sampling time point $t_{sp}$). By taking substantial amount of samplings for the inductor current $I_L$ and calculating the arithmetic mean for the sampled values of the inductor current $I_L$, the interference of noise to the inductor current $I_L$ can be alleviated and the average value of the inductor current $I_L$ can be more precisely detected. The above average value of the inductor current $I_L$ with enhanced accuracy can be used as the average value of the inductor current $I_L$ for CCM operation of the boost PFC 10 in heavy-load status.

For example, besides taking the sampling at sampling time point $t_{sp}$, the control unit 12 may take four additional samplings to the inductor current $I_L$ for duty ratio D of 0.5 at time points symmetric to the sampling time point $t_{sp}$. For example, the additional sampling may be taken at time 5% D and 10% D ahead of the duty ratio D and at time 5% D and 10% D lagged behind the duty ratio D. Namely, consecutive samplings may be taken at duty ratios 0.45, 0.475, 0.525 and 0.55 symmetric to the duty ratio 0.5. The five consecutive sampled inductor currents $I_L$ are for example, 5.55 A (the sampling time point is at D=0.45), 5.61 A (the sampling time point is at D=0.475), 5.66 A (the sampling time point is at D=0.5), 5.77 A (the sampling time point is at D=0.525), and 5.78 A (the sampling time point is at D=0.55). However, above example is only for demonstration and the control unit 12 may take tens of or hundreds of additional samplings around the sampling time point $t_{sp}$, depending on the processing ability of the control unit 12. The sampled current of 5.77 A at D=0.525 is abnormal current value (the reasonable value is around 5.72 A). The arithmetic mean for the sampled values of the inductor current $I_L$ in above example is 5.674 A, which is close to the single sampling of inductor current $I_L$ sampled at D=0.5. The interference of noise to the measurement of the inductor current $I_L$ can be alleviated and more accurate average value of the inductor current $I_L$ can be obtained. Besides, the interference of noise to the measurement of the inductor current IL can be further minimized if tens of or hundreds of additional samplings around the sampling time point $t_{sp}$ are further taken.

As to another example, besides taking the sampling at sampling time point $t_{sp}$, the control unit 12 may take four additional samplings to the inductor current $I_L$ for duty ratio D of 0.5 at time points slightly before or after the sampling time point $t_{sp}$. For example, the additional sampling may be taken at time 5% D and 10% D ahead of the duty ratio D and at time 5% D and 10% D lagged behind the duty ratio D. Namely, consecutive samplings may be taken at duty ratios 0.45, 0.475, 0.525 and 0.55 before and after the duty ratio 0.5. The five consecutive sampled inductor currents $I_L$ are for example, 5.55 A (the sampling time point is at D=0.45), 5.61 A (the sampling time point is at D=0.475), 5.71 A (the sampling time point is at D=0.5), 5.72 A (the sampling time point is at D=0.525), and 5.78 A (the sampling time point is at D=0.55). The sampled current of 5.71 A at D=0.5 is abnormal current value (the reasonable value is around 5.66 A). Considerable error occurs when only one sampling is taken at D=0.5 for the inductor current $I_L$ and the sampled current of 5.71 A is used as the average value of the inductor current $I_L$. By sampling at the sampling time point $t_{sp}$ and additional symmetric time points before and after the sampling time point $t_{sp}$ in consecutive manner, the interference of noise to the measurement of the inductor current $I_L$ can be alleviated and more accurate average value of the inductor current $I_L$ can be obtained.

Besides, the control unit 12 may sample a plurality of average values of the inductor current $I_L$ in successive periods such as in successive turn-on periods or in successive turn-off periods, where each of the average values of the inductor current $I_L$ is for each turn-on period or each turn-off period. The average value of the inductor current $I_L$ may be obtained in manner similar to above mentioned example, namely, sampling a plurality of inductor currents $I_L$ in single period and then calculate the arithmetic mean for the sampled values of the inductor current $I_L$. The arithmetic mean for a plurality of above-mentioned single-period average currents is further calculated to get a successive-period average current. The successive-period average current can be used as the average value of the inductor current $I_L$ for CCM operation when the boost PFC 10 operates in heavy-load status.

For the boost PFC 10 operates in CCM for heavy-load, the control unit 12 may sample the inductor currents $I_L$ at time point of half of the turn-on period counting from the on-starting time $t_{on}$ of the switch unit $S_{PFC}$ when the inductor $L_{PFC}$ in energy-storage operation, and/or the control unit 12 may sample the inductor currents $I_L$ at time point of half of the turn-off period counting from the off-starting time $t_{off}$ of the switch unit $S_{PFC}$ when the inductor $L_{PFC}$ in energy-releasing operation. The sampled current is used as the average value of the inductor current $I_L$ in the corresponding period, thus the detection of average value of the inductor current $I_L$ for CCM is achieved.

Besides, as shown in FIG. 1, the switch unit $S_{PFC}$ has parasitic capacitance Cs. When the inductor $L_{PFC}$ has resonance with the parasitic capacitance Cs, resonant voltage occurs at the common node Pc between the second end of the inductor $L_{PFC}$ and the first end of the switch unit $S_{PFC}$, where the resonant voltage is the voltage level between the common node Pc and ground Gnd. When the resonant voltage is at valley point, the control unit 12 may turn on the switch unit $S_{PFC}$ to provide switching of switch unit $S_{PFC}$ in CRM at this time. The switching loss of the switch unit $S_{PFC}$ is greatly reduced and switching efficiency is enhanced. Moreover, the zero cross detection circuit for sensing zero inductor current can also be omitted.

Therefore, in other embodiment, the current-detecting unit 11 may be replaced by current/voltage detecting unit capable of detecting both of current and voltage, where the current/voltage detecting unit detects the inductor currents $I_L$ and the resonant voltage at the common node Pc. The current/voltage detecting unit sends the detected inductor currents $I_L$ and the detected resonant voltage to the control unit 12 to facilitate the control thereof. In other embodiment, besides the current-detecting unit 11, voltage-detecting unit can be used to detect the resonant voltage at the common node Pc. Similarly, the current-detecting unit 11 sends the detected inductor currents $I_L$ to the control unit 12 and the voltage-detecting unit sends the detected resonant voltage to the control unit 12 to facilitate the control thereof.

Figure 5:
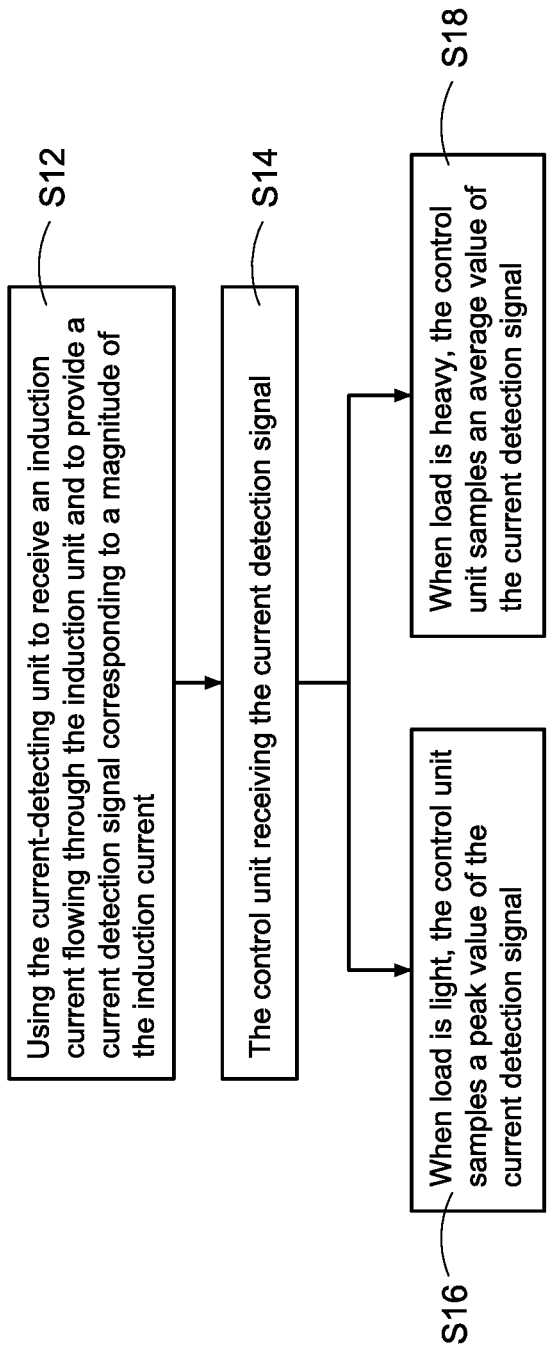
FIG. 5 shows a method for operating the boost PFC of the present invention.

FIG. 5 shows a method for operating the boost PFC 10 of the present invention. The hybrid-mode boost power factor corrector comprises an inductor, a current-detecting unit and a control unit. At first the current-detecting unit is used to receive an inductor current flowing through the inductor and to provide a current detection signal corresponding to the inductor current (S12). Afterward, the control unit receives the current detection signal (S14). When a load is light, the control unit samples a peak value of the current detection signal (S16); or when the load is heavy, the control unit samples an average value of the current detection signal (S18).

To sum up, the present invention has following features and advantages:

1. The hybrid-mode boost power factor corrector can switch between CCM and CRM under the same circuit topology without needing extra detection circuit or logic switching circuit. The cost of device can be saved and the control mechanism can be simplified. The precise and fast processing and operation ability of digital control unit 12 are utilized to realize the control for these two modes (CCM and CRM) with accuracy and in real time.

2. The current-detecting unit 11 may be arranged at various locations along the energy-storage path Ps or the along the energy-releasing path $P_R$ to provide detection of the inductor current $I_L$ with high flexibility, high reliability and adaptability.

3. At the symmetric time points in one period, the inductor currents $I_L$ are successive sampled and an arithmetic mean is calculated to obtain single-period average value for the inductor currents $I_L$. Otherwise, an arithmetic mean for the single-period average values at successive periods is calculated to obtain a successive-period average value for the inductor currents $I_L$. The interference of noise to the measurement of the inductor current $I_L$ can be alleviated and more accurate average value of the inductor current $I_L$ can be obtained.

4. When control unit 12 detects that the resonant voltage is at valley point, the control unit 12 may turn on the switch unit $S_{PFC}$ at this time to greatly reduce the switching loss of the switch unit $S_{PFC}$ and enhancing switching efficiency. Moreover, the zero cross detection circuit for sensing zero inductor current can also be omitted to provide switching of switch unit $S_{PFC}$ in CRM.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A hybrid-mode boost power factor corrector comprising:
    an inductor having a first end coupled to a DC input power source and a second end;
    a switch unit having a first end and a second end coupled to a ground;
    a diode unit having a first end coupled to the second end of the inductor and the first end of the switch unit, and a second end, where a DC output power is provided between the second end of the diode unit and the ground to supply electric power to a load;
    a current-detecting unit receiving an inductor current flowing through the inductor and providing a current detection signal corresponding to a magnitude of the inductor current; and
    a control unit coupled to the current-detecting unit and receiving the current-detecting unit;
    wherein, when the hybrid-mode boost power factor corrector is operated in a light-load condition, the control unit samples a peak value of the current detection signal; when the hybrid-mode boost power factor corrector is operated in a heavy-load condition, the control unit samples an average value of the current detection signal;
    wherein the current-detecting unit is arranged on an energy-releasing path provided by the inductor, and the switch unit has a switching period and a duty ratio; when the load is heavy, the control unit is configured to sample an average value of the current detection signal at a sampling time point, wherein the sampling time point is:

$$t_{sp} = t_{off} + \frac{(1-D)}{2} \times T_{SW};$$

wherein $t_{sp}$ is the sampling time point, $t_{off}$ is off-starting time for the switch unit, D is the duty ratio, and Tsw is the switching period.

2. The hybrid-mode boost power factor corrector in claim 1, wherein the current-detecting unit is arranged on an energy-storage path provided by the inductor, and the switch unit has a switching period and a duty ratio; when the load is heavy, the control unit is configured to sample an average value of the current detection signal at a sampling time point, wherein the sampling time point is:

$$t_{sp} = t_{on} + \frac{D}{2} \times T_{SW};$$

wherein $t_{sp}$ is the sampling time point, $t_{on}$ is on-starting time for the switch unit, D is the duty ratio, and Tsw is the switching period.

3. The hybrid-mode boost power factor corrector in claim 2, wherein the control unit is configured to sample a plurality of current detection signals at the sampling time point and at symmetric time points before and after the sampling time point during a same period, the control unit is configured to calculate an arithmetic mean for sampled current detection signals to obtain a single-period average value.

4. The hybrid-mode boost power factor corrector in claim 3, wherein the control unit is configured to calculate an arithmetic mean for the single-period average values at successive periods to obtain a successive-period average value.

5. The hybrid-mode boost power factor corrector in claim 1, wherein the control unit is configured to sample a plurality of current detection signals at the sampling time point and at symmetric time points before and after the sampling time point during a same period, the control unit is configured to calculate an arithmetic mean for sampled current detection signals to obtain a single-period average value.

6. The hybrid-mode boost power factor corrector in claim 5, wherein the control unit is configured to calculate an arithmetic mean for the single-period average values at successive periods to obtain a successive-period average value.

7. The hybrid-mode boost power factor corrector in claim 1, when the load is light, the hybrid-mode boost power factor corrector operates in critical conduction mode (CRM); when the load is heavy, the hybrid-mode boost power factor corrector operates in continuous conduction mode (CCM).

8. The hybrid-mode boost power factor corrector in claim 1, wherein the current-detecting unit is a current detecting resistor or a Hall sensor.

9. The hybrid-mode boost power factor corrector in claim 1, wherein the switch unit has a parasitic capacitance, the hybrid-mode boost power factor corrector has a resonant voltage at a common node Pc between the second end of the inductor and the first end of the switch unit when the inductor has resonance with the parasitic capacitance; wherein the control unit is configured to switch the switch unit when the control unit senses that the resonant voltage is at valley point.

10. The hybrid-mode boost power factor corrector in claim 1, wherein the control unit is a digital controller.

11. A method of operating a hybrid-mode boost power factor corrector, the hybrid-mode boost power factor corrector comprising an inductor, a current-detecting unit and a control unit, the method comprising:

using the current-detecting unit to receive an inductor current flowing through the inductor and to provide a current detection signal corresponding to a magnitude of the inductor current;

the control unit receiving the current detection signal;

when a load is light, the control unit samples a peak value of the current detection signal;

when the load is heavy, the control unit samples an average value of the current detection signal;

wherein the hybrid-mode boost power factor corrector further comprises a switch unit, wherein the current-detecting unit is arranged on an energy-releasing path provided by the inductor, and the switch unit has a switching period and a duty ratio; when the load is heavy, the control unit is configured to sample an average value of the current detection signal at a sampling time point, wherein the sampling time point is:

$$t_{sp} = t_{off} + \frac{(1-D)}{2} \times T_{SW};$$

wherein $t_{sp}$ is the sampling time point, $t_{off}$ is off-starting time for the switch unit, D is the duty ratio, and Tsw is the switching period.

12. The method in claim 11, wherein the hybrid-mode boost power factor corrector further comprises a switch unit, the current-detecting unit is arranged on an energy-storage path provided by the inductor, and the switch unit has a switching period and a duty ratio; when the load is heavy, the control unit is configured to sample an average value of the current detection signal at a sampling time point, wherein the sampling time point is:

$$t_{sp} = t_{on} + \frac{D}{2} \times T_{SW};$$

wherein $t_{sp}$ is the sampling time point, $t_{on}$ is on-starting time for the switch unit, D is the duty ratio, and Tsw is the switching period.

13. The method in claim 12, wherein the control unit is configured to sample a plurality of current detection signals at the sampling time point and at symmetric time points before and after the sampling time point during a same period, the control unit is configured to calculate an arithmetic mean for sampled current detection signals to obtain a single-period average value.

14. The method in claim 13, wherein the control unit is configured to calculate an arithmetic mean for the single-period average values at successive periods to obtain a successive-period average value.

15. The method in claim 11, wherein the control unit is configured to sample a plurality of current detection signals at the sampling time point and at symmetric time points before and after the sampling time point during a same period, the control unit is configured to calculate an arithmetic mean for sampled current detection signals to obtain a single-period average value.

16. The method in claim 15, wherein the control unit is configured to calculate an arithmetic mean for the single-period average values at successive periods to obtain a successive-period average value.

17. The method in claim 11, when the load is light, the hybrid-mode boost power factor corrector operates in critical conduction mode (CRM); when the load is heavy, the hybrid-mode boost power factor corrector operates in continuous conduction mode (CCM).

18. The method in claim 11, wherein the control unit is a digital controller.

\* \* \* \* \*